(12) United States Patent
Kawasaki

(10) Patent No.: US 7,072,119 B2
(45) Date of Patent: Jul. 4, 2006

(54) AFOCAL ZOOM LENS FOR MICROSCOPES

(75) Inventor: Kenji Kawasaki, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/938,884

(22) Filed: Sep. 13, 2004

(65) Prior Publication Data

US 2005/0174654 A1  Aug. 11, 2005

(30) Foreign Application Priority Data

Sep. 17, 2003  (JP) .............................. 2003-325101

(51) Int. Cl.
*G02B 21/02* (2006.01)
(52) U.S. Cl. ....................... 359/659; 359/763; 359/764
(58) Field of Classification Search ................ 359/659, 359/763, 764
See application file for complete search history.

(56) References Cited

U.S. PATENT DOCUMENTS 5,050,972 A * 9/1991 Mukaiya et al. ............ 359/683

FOREIGN PATENT DOCUMENTS

| JP | 59-038651 | 9/1985 |
|----|-----------|--------|
| JP | 09-273317 | 4/1999 |
| JP | 11-333154 | 6/2001 |

* cited by examiner

*Primary Examiner*—Hung Xuan Dang
*Assistant Examiner*—Joseph Martinez
(74) *Attorney, Agent, or Firm*—Kenyon & Kenyon LLP

(57) ABSTRACT

An afocal zoom lens for microscopes includes five lens units having, in order from the object side, positive, negative, negative, positive, and negative refracting powers. When the magnification of the afocal zoom lens is changed in the range from a low-magnification position to a high-magnification position, a first lens unit and a fifth lens unit are fixed, a second lens unit is moved toward the image side, and a fourth lens unit is moved toward the object side. The afocal zoom lens satisfies the following condition:

$$0 \leq F2/F3 \leq 2.5$$

where the focal length of the second lens unit is represented by F2 and the focal length of a third lens unit is represented by F3. The third lens unit is constructed with at least one negative lens with a concave surface facing the object side.

9 Claims, 12 Drawing Sheets

FIG.2A
SPHERICAL ABERRATION
NA=0.032
FIG.2B
ASTIGMATISM
IH=11.00
FIG.2C
DISTORTION
IH=11.00
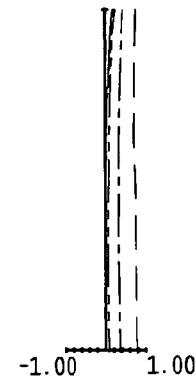
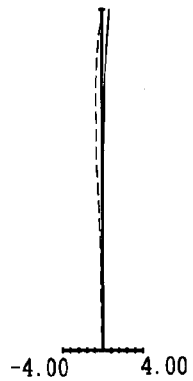
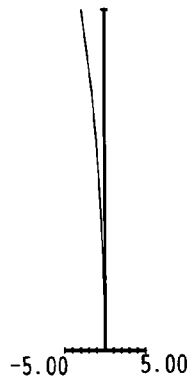
FIG.2D
NA=0.025
FIG.2E
IH=11.00
FIG.2F
IH=11.00
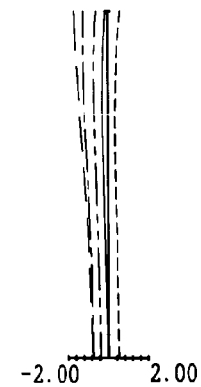
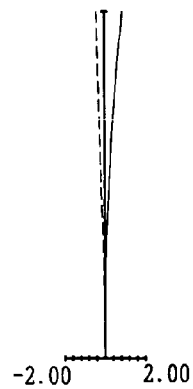
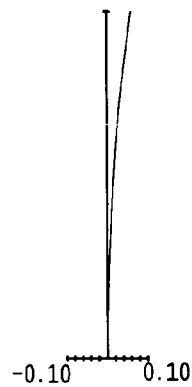
FIG.2G
NA=0.013
FIG.2H
IH=11.00
FIG.2I
IH=11.00
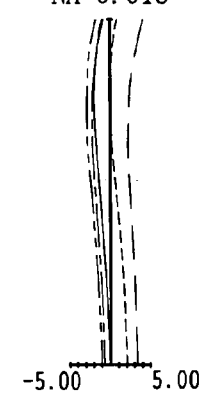
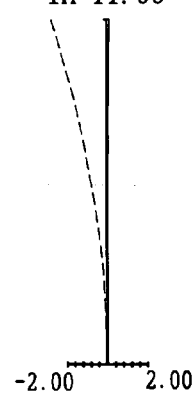
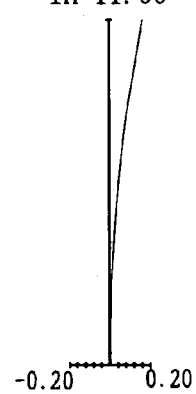
—··— 546.07
— — 435.84
—·— 486.13
------- 656.27
———— 587.27

| FIG.4A | FIG.4B | FIG.4C |
|---|---|---|
| SPHERICAL ABERRATION | ASTIGMATISM | DISTORTION |
| NA=0.032 | IH=11.00 | IH=11.00 |
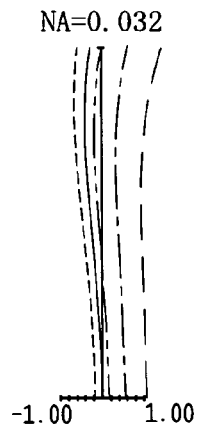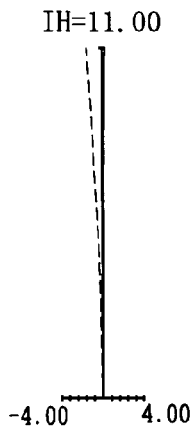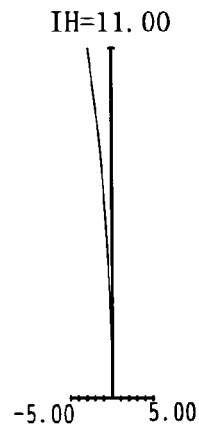
| FIG.4D | FIG.4E | FIG.4F |
|---|---|---|
| NA=0.025 | IH=11.00 | IH=11.00 |
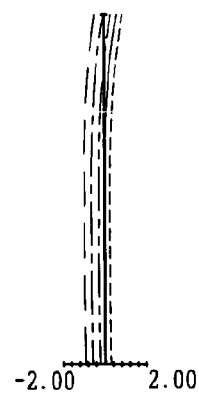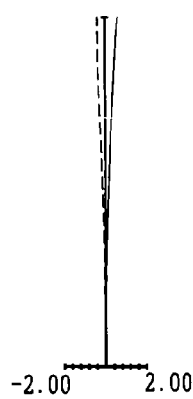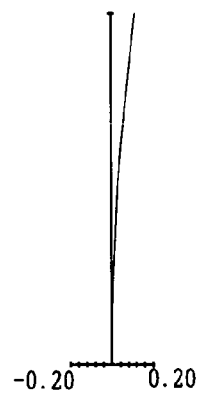
| FIG.4G | FIG.4H | FIG.4I |
|---|---|---|
| NA=0.019 | IH=11.00 | IH=11.00 |
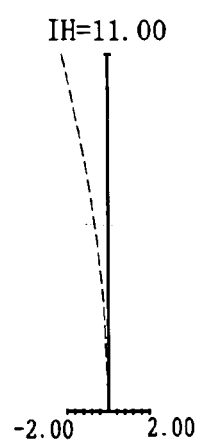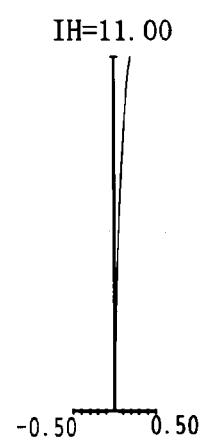
- — - — 546.07
- — — — 435.84
- — - — 486.13
- - - - - - 656.27
- ——— 587.27

SPHERICAL ABERRATION
NA=0.032

-1.00    1.00

ASTIGMATISM
IH=11.00

-4.00    4.00

DISTORTION
IH=11.00

-5.00    5.00

NA=0.025

-2.00    2.00

IH=11.00

-2.00    2.00

IH=11.00

-0.50    0.50

NA=0.010

-8.00    8.00

IH=11.00

-2.00    2.00

IH=11.00

-0.50    0.50

—·—·— 546.07
— — — 435.84
— · — 486.13
- - - - 656.27
———— 587.27

| FIG.8A | FIG.8B | FIG.8C |
|---|---|---|
| SPHERICAL ABERRATION | ASTIGMATISM | DISTORTION |
| NA=0.030 | IH=11.00 | IH=11.00 |
| -1.00  1.00 | -4.00  4.00 | -5.00  5.00 |

| FIG.8D | FIG.8E | FIG.8F |
|---|---|---|
| NA=0.025 | IH=11.00 | IH=11.00 |
| -2.00  2.00 | -2.00  2.00 | -0.20  0.20 |

| FIG.8G | FIG.8H | FIG.8I |
|---|---|---|
| NA=0.013 | IH=11.00 | IH=11.00 |
| -5.00  5.00 | -2.00  2.00 | -0.50  0.50 |

—··— 546.07
— — — 435.84
—·— 486.13
- - - - 656.27
——— 587.27

SPHERICAL ABERRATION
NA=0.032

ASTIGMATISM
IH=11.00

DISTORTION
IH=11.00

NA=0.025

IH=11.00

IH=11.00

NA=0.013

IH=11.00

IH=11.00

— · · — 546.07
— — — 435.84
— · — 486.13
- - - - 656.27
——— 587.27

AFOCAL ZOOM LENS FOR MICROSCOPES

This application claims priority to Japanese Patent Application No. 2003-325101 filed 17 Sep. 2003, the content of which is incorporated herein by reference in its entirety.

BACKGROUND OF THE INVENTION

1. Field of the Invention

This invention relates to an afocal zoom lens for microscopes.

2. Description of Related Art

Conventional afocal zoom lenses for microscopes are proposed, for example, by Japanese Patent Publication No. Hei 0677104 and Japanese Patent Kokai Nos. Hei 11-95009 and 2001-154092.

SUMMARY OF THE INVENTION

The afocal zoom lens for microscopes according to the present invention includes five lens units having, in order from the object side, positive, negative, negative, positive, and negative refracting powers. The afocal zoom lens is constructed so that when the magnification of the afocal zoom lens is changed in the range from a low-magnification position to a high-magnification position, a first lens unit and a fifth lens unit are fixed, a second lens unit is moved toward the image side, and a fourth lens unit is moved toward the object side.

When the focal length of the second lens unit is represented by F2 and the focal length of a third lens unit is represented by F3, the afocal zoom lens for microscopes according to the present invention satisfies the following condition:

$$0 \leq F2/F3 \leq 2.5 \quad (1)$$

The afocal zoom lens for microscopes according to the present invention is such that the third lens unit is constructed with at least one negative lens with a concave surface facing the object side.

According to the present invention, the afocal zoom lens, in contrast with the conventional afocal zoom lens of a four-lens-unit arrangement, is capable of reducing the overall length and achieving a high variable magnification ratio exceeding 15 and correction for aberration in the whole variable magnification range.

According to the present invention, the third lens unit is constructed as a moving lens unit, and thereby the performance of correction for aberration is further improved in the whole variable magnification range. At the same time, the shift of the position of an exit pupil caused when the magnification is changed in the range from the low-magnification position to the high-magnification is suppressed and a reduction of the amount of marginal light can be obviated, so that a systematic property of the optical system is improved.

These and other features and advantages of the present invention will become apparent from the following detailed description of the preferred embodiments when taken in conjunction with the accompanying drawings.

BRIEF DESCRIPTION OF THE DRAWINGS

FIGS. 2A, 2B, and 2C are diagrams showing aberration characteristics at the low-magnification position of the afocal zoom lens in the first embodiment;

FIGS. 2D, 2E, and 2F are diagrams showing aberration characteristics at the middle position of the afocal zoom lens in the first embodiment;

FIGS. 2G, 2H, and 2I are diagrams showing aberration characteristics at the high-magnification position of the afocal zoom lens in the first embodiment;

FIGS. 4A, 4B, and 4C are diagrams showing aberration characteristics at the low-magnification position of the afocal zoom lens in the second embodiment;

FIGS. 4D, 4E, and 4F are diagrams showing aberration characteristics at the middle position of the afocal zoom lens in the second embodiment;

FIGS. 4G, 4H, and 4I are diagrams showing aberration characteristics at the high-magnification position of the afocal zoom lens in the second embodiment;

FIGS. 8A, 8B, and 8C are diagrams showing aberration characteristics at the low-magnification position of the afocal zoom lens in the fourth embodiment;

FIGS. 8D, 8E, and 8F are diagrams showing aberration characteristics at the middle position of the afocal zoom lens in the fourth embodiment;

FIGS. 8G, 8H, and 8I are diagrams showing aberration characteristics at the high-magnification position of the afocal zoom lens in the fourth embodiment;

DETAILED DESCRIPTION OF THE PREFERRED EMBODIMENTS

Figure 1A:
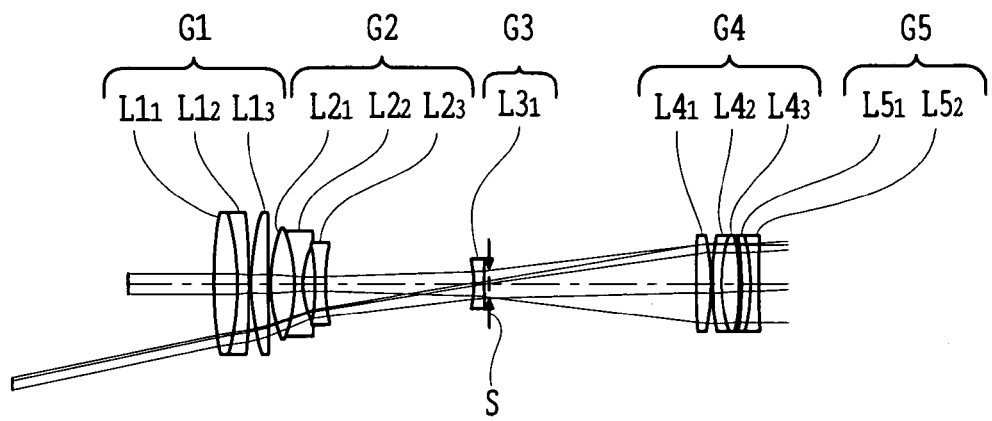
FIGS. 1A, 1B, and 1C are sectional views showing optical arrangements, developed along the optical axis, at low-magnification, middle, and high-magnification positions, respectively, of a first embodiment of the afocal zoom lens according to the present invention.

Before undertaking the description of the embodiments, the function and effect of the present invention will be explained.

The afocal zoom lens, as in the present invention, includes five lens units having, in order from the object side, positive, negative, negative, positive, and negative refracting powers. When the magnification is changed in the range from the low-magnification position to the high-magnification position, the first lens unit and the fifth lens unit remain fixed, the second lens unit is moved from the object side toward the image side, and the fourth lens unit is moved from the image side toward the object side.

In contrast to the conventional afocal zoom lens of the four-lens-unit arrangement in which the second lens unit has a variable magnification function, the afocal zoom lens of the present invention is such that two lens units, the second and third lens units, have the variable magnification functions, not the negative refracting power of the second lens unit alone. According to this arrangement of the present invention, the negative refracting power of the variable magnification function is strengthened and thereby a high variable magnification ratio can be obtained. Moreover, the five-lens-unit arrangement is constructed so that the variable magnification functions are shared between two negative refracting powers of the second and third lens units, and thereby the high magnification ratio exceeding 15 and a compact design can be achieved simultaneously. Also, the third lens unit may be fixed when the magnification is changed, but when it is designed to move, the performance of correction for aberration is further improved in the whole variable magnification range. At the same time, the shift of the position of the exit pupil caused when the magnification is changed in the range from the low-magnification position to the high-magnification position is suppressed and a reduction of the amount of marginal light, due to eclipse, can be obviated, so that the systematic property of the optical system is improved.

Condition (1) is provided for the purpose of constructing the afocal zoom lens so that aberration can be properly corrected in the whole zoom range.

Below the lower limit of Condition (1), the variable magnification ratio cannot be increased and correction for aberration at the high-magnification position becomes difficult.

Beyond the upper limit of Condition (1), the refracting power of the third lens unit is so high that correction for aberration at the low-magnification position becomes difficult. Alternatively, the overall length of the afocal zoom lens is increased, which is unfavorable.

In the afocal zoom lens for microscopes according to the present invention, when the focal length of the first lens unit is denoted by F1, a combined focal length of the second and third lens units at the low-magnification position is denoted by F23L, and a combined focal length of the second and third lens units at the high-magnification position is denoted by F23H, the focal zoom lens satisfies one of the following conditions:

Since the second lens unit is moved along the optical axis when the magnification is changed, the combined focal length of the second and third lens units varies with the low-magnification position and the high-magnification position.

$$1 \leq F23L/F23H \leq 3 \quad (2)$$

$$3 \leq |F1/F23L| \leq 15 \quad (3)$$

When Condition (2) is satisfied, the combined focal length of the second and third lens units at the low-magnification position becomes shorter than that of the second and third lens units at the high-magnification position. Thus, the negative refracting power of the variable magnification function is strengthened at the low-magnification position so that the focal length can be made shorter at the low-magnification position.

In addition, since the negative refracting powers of the second and third lens units at the high-magnification position and the low-magnification position are optimized in a good balance, it becomes possible to further correct aberrations at the low- and high-magnification positions.

When Condition (3) is satisfied, the first lens unit and the second lens unit do not interfere with each other at the low-magnification position, and off-axis aberration produced at the low-magnification position and spherical aberration at the high-magnification position can be favorably corrected.

Below the lower limit of Condition (2), the negative refracting power of the third lens unit is weakened and the refracting power of the second lens unit is strengthened. Consequently, the performance of correction for aberration is degraded at the low-magnification position, or the overall length of the afocal zoom lens is increased.

Beyond the upper limit of Condition (2), the negative refracting power of the second lens unit or the third lens unit is so high that correction for aberration in the whole zoom range becomes difficult, which is unfavorable.

Below the lower limit of Condition (3), it becomes difficult to obtain the variable magnification ratio exceeding 15, or the first lens unit and the second lens unit interfere with each other at the low-magnification position. This is unfavorable.

Beyond the upper limit of Condition (3), the performance of correction for off-axis aberration at the low-magnification position or for axial aberration at the high-magnification position is degraded, which is undesirable.

In the afocal zoom lens of the present invention, when a distance from the object-side surface of the first lens unit to the object-side surface of the third lens unit at the low-magnification position is represented by D3L and the overall length of the afocal zoom lens is represented by D0, it is more desirable to satisfy the following condition:

$$0.3 \leq D3L/D0 \leq 0.7 \quad (4)$$

When Condition (4) is satisfied, the amount of movement of each of the second and fourth lens units moved in the magnification change is optimized. At the same time, the fourth lens unit ceases to interfere with the fifth lens unit at the low-magnification position, and each of the second lens unit and the fourth lens unit ceases to interfere with the third lens unit at the high-magnification position. In this way, the high variable magnification ratio and a compact design of the afocal zoom lens can be achieved.

Beyond the upper limit of Condition (4), the amount of movement of the fourth lens unit is reduced to lower the variable magnification ratio, or the fourth lens unit interferes with the fifth lens unit. Alternatively, the refracting power of the fourth lens unit is increased and correction for spherical aberration becomes difficult at the low-magnification position.

Below the lower limit of Condition (4), the amount of movement of the second lens unit is reduced to lower the variable magnification ratio, or the second lens unit interferes with the first lens unit or the third lens unit. Alternatively, the refracting power of the second lens unit is strengthened, and off-axis aberration at the low-magnification position and spherical aberration at the high-magnification position are deteriorated, which is undesirable.

When the third lens unit, as in the afocal zoom lens of the present invention, is constructed with at least one negative lens with a concave surface facing the object side, astigmatism and coma can be effectively corrected in the whole zoom range.

In the optical arrangement mentioned above, when the focal length of the third lens unit is denoted by F3, the radius of curvature of the concave surface facing the object side is denoted by RG3, the refractive index of the negative lens is denoted by ng3, and the variable magnification ratio is denoted by Z, it is desirable to satisfy the following conditions:

$$7 \leq RG3/F3 \cdot Z \leq 30 \tag{5}$$

$$1.65 \leq ng3 \tag{6}$$

When Condition (5) is satisfied, a proper bending shape of each surface of the third lens unit corresponding to the variable magnification ratio exceeding 10 is given and coma can be favorably corrected in the whole zoom range.

When Condition (6) is satisfied, the Petzval sum is suppressed, which is favorable for correcting curvature of field.

Beyond the upper limit of Condition (5), the radius of curvature of the image-side surface of the negative lens in the third lens unit becomes small, and spherical aberration and come, produced by the negative lens in the third lens unit are extremely increased in the range from the low-magnification position to the middle position. This is unfavorable.

Below the lower limit of Condition (5), the radius of curvature of the concave surface facing the object side, of the negative lens in the third lens unit becomes small, and spherical aberration and coma, produced by the negative lens in the third lens unit are extremely increased in the whole zoom range. This is unfavorable.

Below the lower limit of Condition (6), curvature of field is deteriorated and the radius of curvature of the concave surface facing the object side becomes so small that off-axis aberration at the low-magnification position and spherical aberration produced in the range from the middle position to the high-magnification position are deteriorated. This is unfavorable.

Additionally, in the afocal zoom lens of the present invention, it is desirable that an aperture stop is interposed between the second lens unit and the fourth lens unit, because eclipse caused in each zoom region can be properly obviated.

EMBODIMENTS

Subsequently, the embodiments of the present invention will be described with reference to the drawings.

The afocal zoom lens of the present invention is used in combination with an imaging lens shown in FIG. 11 and Numerical data 6 to be described later. The focal length of the imaging lens is 211.675 mm and a prism optical system is located on the image side of the imaging lens.

Figure 12A:
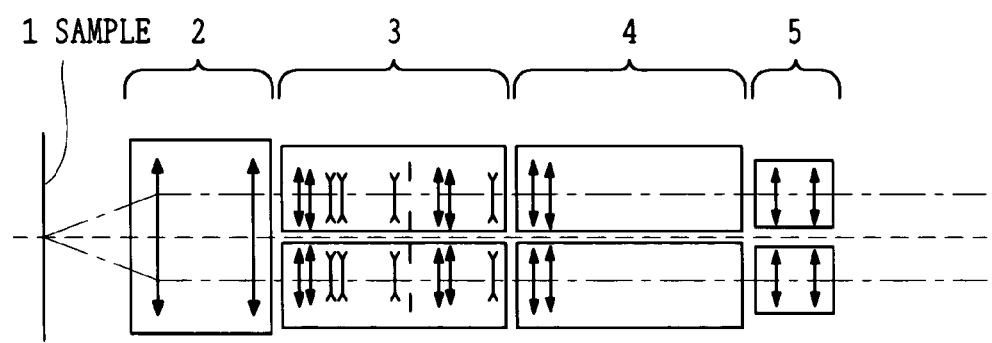
FIGS. 12A and 12B are conceptual views showing the entire arrangements of stereomicroscope optical systems, each having the afocal zoom lens of each embodiment and the imaging lens of FIG. 11.
Figure 12B:
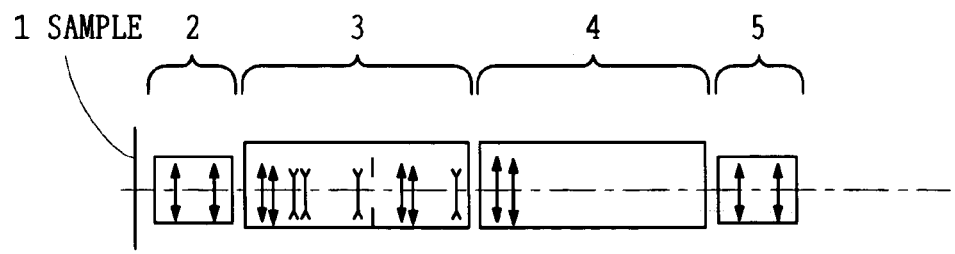

The afocal zoom lens of the present invention, as show in FIG. 12A, is capable of constructing a stereomicroscope optical system of a Galilean type (a parallel optical system) by combining an objective lens 2, an imaging lens optical system 4, and an eyepiece 5. Alternatively, as shown in FIG. 12B, a microscope zoom optical system can be constructed by combining the objective lens 2 of an infinity-corrected optical system, an afocal zoom lens 3 of the present invention, the imaging lens optical system 4, and the eyepiece 5.

First Embodiment

Figure 1B:
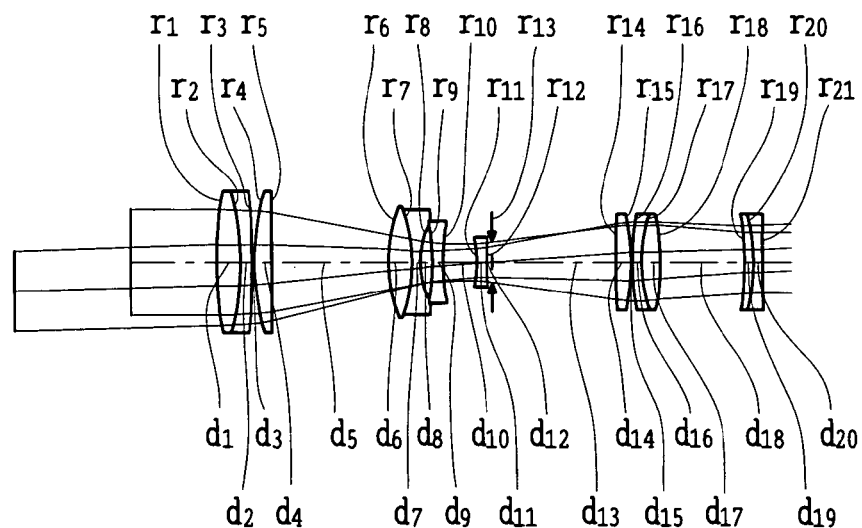
Figure 1C:
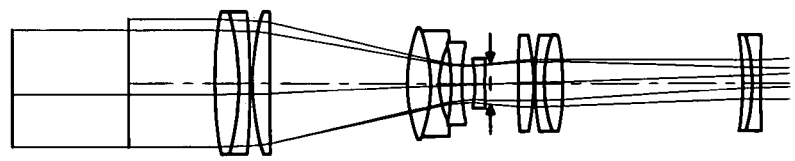

FIGS. 1A, 1B, and 1C show optical arrangements, developed along the optical axis, at low-magnification, middle, and high-magnification positions, respectively, of the first embodiment of the afocal zoom lens according to the present invention. FIGS. 2A–2C, 2D–2F, and 2G–2I show aberration characteristics at the low-magnification, middle, and high-magnification positions, respectively, of the afocal zoom lens in the first embodiment.

The afocal zoom lens of the first embodiment comprises, in order from the object side, a first lens unit G1 with positive refracting power, a second lens unit G2 with negative refracting power, a third lens unit G3 with negative refracting power, an aperture stop S, a fourth lens unit G4 with positive refracting power, and a fifth lens unit G5 with negative refracting power.

The first lens unit G1 includes, in order from the object side, a cemented lens component of a biconvex lens $L1_1$ and a negative meniscus lens $L1_2$ with a concave surface facing the object side, and a plano-convex lens $L1_3$ whose object-side surface is convex and whose image-side surface is flat.

The second lens unit G2 includes, in order from the object side, a cemented lens component of a biconvex lens $L2_1$ and a biconcave lens $L2_2$, and a biconcave lens $L2_3$.

The third lens unit G3 is constructed with a biconcave lens $L3_1$.

The fourth lens unit G4 includes a biconvex lens $L4_1$ and a cemented lens component of a negative meniscus lens $L4_2$ with a convex surface facing the object side and a biconvex lens $L4_3$.

The fifth lens unit G5 is constructed with a cemented lens component of a positive meniscus lens $L5_1$ with a concave surface facing the object side and a biconcave lens $L5_2$.

When the magnification is changed in the range from the low-magnification position to the high-magnification position, the first lens unit G1, the third lens unit G3, the aperture stop S, and the fifth lens unit G5 remain fixed, the second lens unit G2 is moved from the object side toward the image side, and the fourth lens unit G4 is moved from the image side toward the object side.

Subsequently, numerical data of optical members constituting the afocal zoom lens of the first embodiment are shown below.

Also, in the numerical data of the first embodiment, $r_1$, $r_2$, . . . denote radii of curvature of surfaces of individual lenses; d1, d2, . . . denote thicknesses of individual lenses or air spacings between them; $n_{d1}$, $n_{d2}$, . . . denote refractive indices of individual lenses at the d line; $v_{d1}, v_{d2}, \ldots$ denote Abbe's numbers of individual lenses; F1, F2, . . . denote focal lengths of individual lenses; FL denotes of the focal length of the entire system; and NA denotes a numerical aperture.

These symbols are also used for the numerical data of the other embodiments to be described later.

Numerical data 1

| | | | |
|---|---|---|---|
| $r_1 = 67.1073$ | $d_1 = 4.15$ | $n_{d1} = 1.497$ | $v_{d1} = 81.54$ |
| $r_2 = -48.4555$ | $d_2 = 2$ | $n_{d2} = 1.71736$ | $v_{d2} = 29.52$ |
| $r_3 = -182.742$ | $d_3 = 0.25$ | | |
| $r_4 = 42.6536$ | $d_4 = 2.9$ | $n_{d4} = 1.56907$ | $v_{d4} = 71.3$ |
| $r_5 = \infty$ | $d_5 = D5$ | | |
| $r_6 = 24.9018$ | $d_6 = 4.05$ | $n_{d6} = 1.76182$ | $v_{d6} = 26.52$ |
| $r_7 = -27.9083$ | $d_7 = 1.5$ | $n_{d7} = 1.72916$ | $v_{d7} = 54.68$ |
| $r_8 = 15.5066$ | $d_8 = 2.0814$ | | |
| $r_9 = -37.4483$ | $d_9 = 1.8$ | $n_{d9} = 1.755$ | $v_{d9} = 52.32$ |
| $r_{10} = 33.1991$ | $d_{10} = D10$ | | |
| $r_{11} = -23.7456$ | $d_{11} = 1.83$ | $n_{d11} = 1.7847$ | $v_{d11} = 26.29$ |
| $r_{12} = 103.6318$ | $d_{12} = 1$ | | |
| $r_{13} = \infty$ (Aperture stop) | $d_{13} = D13$ | | |
| $r_{14} = 162.471$ | $d_{14} = 2.6$ | $n_{d14} = 1.603$ | $v_{d14} = 65.44$ |
| $r_{15} = -42.4593$ | $d_{15} = 0.2$ | | |
| $r_{16} = 47.3698$ | $d_{16} = 1.6$ | $n_{d16} = 1.834$ | $v_{d16} = 37.16$ |
| $r_{17} = 24.9751$ | $d_{17} = 3.1$ | $n_{d17} = 1.497$ | $v_{d17} = 81.54$ |
| $r_{18} = -53.5454$ | $d_{18} = D18$ | | |
| $r_{19} = -55.8574$ | $d_{19} = 1.6$ | $n_{d19} = 1.7552$ | $v_{d19} = 27.51$ |
| $r_{20} = -31.8024$ | $d_{20} = 1.5$ | $n_{d20} = 1.741$ | $v_{d20} = 52.64$ |
| $r_{21} = 746.0709$ | | | |

Zoom data

| | Low-magnification | Middle | High-magnification |
|---|---|---|---|
| FL | 54 mm | 360 mm | 864 mm |
| NA | 0.03195 | 0.02533 | 0.01273 |
| Overall length | 95 mm | 95 mm | 95 mm |
| Exit end position | −359.0 | −238.7 | −220.6 |
| D5 | 0.367 | 20.459 | 24.018 |
| D10 | 25.963 | 5.871 | 2.313 |
| D13 | 36.010 | 21.627 | 4.948 |
| D18 | 0.498 | 14.881 | 31.560 |

Variable magnification ratio: 16

Focal lengths

| | |
|---|---|
| F1 = | 50.55 |
| F2 = | −19.57 |
| F3 = | −24.47 |
| F4 = | 32.47 |
| F5 = | −71.00 |
| F1/F3 = | −2.07 |
| F2/F3 = | 0.80 |
| F4/F3 = | −1.33 |
| F5/F3 = | 2.90 |
| F23L = | −6.91 |
| F23H = | −10.49 |
| F23L/F23H = | 1.52 |
| |F1/F23L| = | 7.32 |
| D3L/D0 = | 0.47 |
| (RG3/F3) · Z = | 15.53 |
| ng3 = | 1.7847 |

Second Embodiment

Figure 3A:
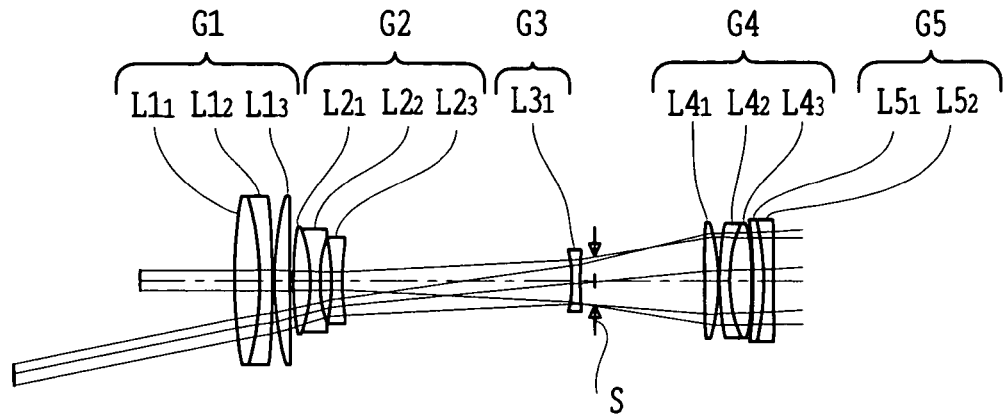
FIGS. 3A, 3B, and 3C are sectional views showing optical arrangements, developed along the optical axis, at low-magnification, middle, and high-magnification positions, respectively, of a second embodiment of the afocal zoom lens according to the present invention.
Figure 3B:
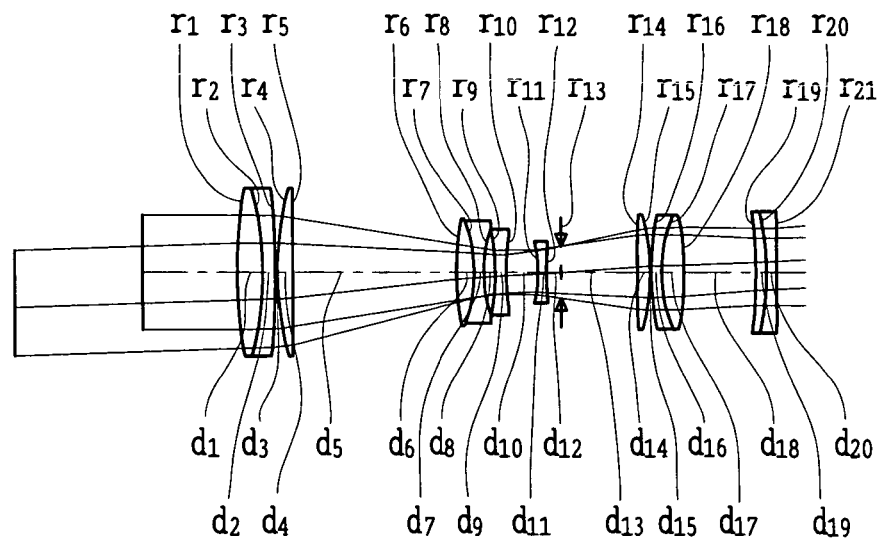
Figure 3C:
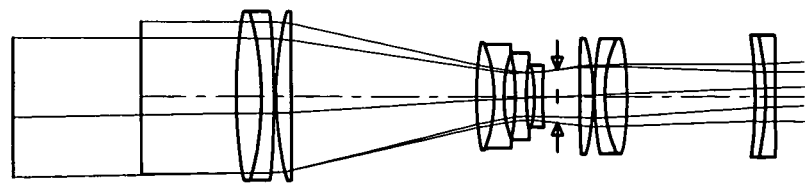

FIGS. 3A, 3B, and 3C show optical arrangements, developed along the optical axis, at low-magnification, middle, and high-magnification positions, respectively, of the second embodiment of the afocal zoom lens according to the present invention. FIGS. 4A–4C, 4D–4F, and 4G–4I show aberration characteristics at the low-magnification, middle, and high-magnification positions, respectively, of the afocal zoom lens in the second embodiment.

The afocal zoom lens of the second embodiment comprises, in order from the object side, the first lens unit G1 with positive refracting power, the second lens unit G2 with negative refracting power, the third lens unit G3 with negative refracting power, the aperture stop S, the fourth lens unit G4 with positive refracting power, and the fifth lens unit G5 with negative refracting power.

The first lens unit G1 includes, in order from the object side, the cemented lens component of the biconvex lens L1$_1$ and the negative meniscus lens L1$_2$ with the concave surface facing the object side, and the plano-convex lens L1$_3$ whose object-side surface is convex and whose image-side surface is flat.

The second lens unit G2 includes, in order from the object side, the cemented lens component of the biconvex lens L2$_1$ and the biconcave lens L2$_2$, and the biconcave lens L2$_3$.

The third lens unit G3 is constructed with the biconcave lens L3$_1$.

The fourth lens unit G4 includes the biconvex lens L4$_1$ and the cemented lens component of the negative meniscus lens L4$_2$ with the convex surface facing the object side and the biconvex lens L4$_3$.

The fifth lens unit G5 is constructed with the cemented lens component of the positive meniscus lens L5$_1$ with the concave surface facing the object side and the biconcave lens L5$_2$.

When the magnification is changed in the range from the low-magnification position to the high-magnification position, the first lens unit G1 and the fifth lens unit G5 remain fixed, the second lens unit G2 is moved from the object side toward the image side, the third lens unit G3 is moved, together with the aperture stop S, from the image side toward the object side, and the fourth lens unit G4 is moved from the image side toward the object side. The third lens unit G3 is moved when the magnification is changed, and thereby an optical system suppressing the shift of the position of the exit pupil is realized.

Subsequently, numerical data of optical members constituting the afocal zoom lens of the second embodiment are shown below.

Numerical data 2

| | | | |
|---|---|---|---|
| $r_1 = 78.1429$ | $d_1 = 3.986$ | $n_{d1} = 1.497$ | $v_{d1} = 81.54$ |
| $r_2 = -50.641$ | $d_2 = 2$ | $n_{d2} = 1.71736$ | $v_{d2} = 29.52$ |
| $r_3 = -177.066$ | $d_3 = 0.25$ | | |
| $r_4 = 45.3027$ | $d_4 = 2.5638$ | $n_{d4} = 1.56907$ | $v_{d4} = 71.3$ |
| $r_5 = \infty$ | $d_5 = D5$ | | |
| $r_6 = 46.1166$ | $d_6 = 2.7744$ | $n_{d6} = 1.7847$ | $v_{d6} = 26.29$ |
| $r_7 = -23.4179$ | $d_7 = 1.5103$ | $n_{d7} = 1.741$ | $v_{d7} = 52.64$ |
| $r_8 = 21.0177$ | $d_8 = 1.8346$ | | |
| $r_9 = -31.1044$ | $d_9 = 1.8$ | $n_{d9} = 1.755$ | $v_{d9} = 52.32$ |
| $r_{10} = 43.9016$ | $d_{10} = D10$ | | |
| $r_{11} = -23.4911$ | $d_{11} = 1.8$ | $n_{d11} = 1.7725$ | $v_{d11} = 49.6$ |
| $r_{12} = 2180.678$ | $d_{12} = 2.0345$ | | |
| $r_{13} = \infty$ (Aperture stop) | $d_{13} = D13$ | | |
| $r_{14} = 224.1202$ | $d_{14} = 2.1284$ | $n_{d14} = 1.56907$ | $v_{d14} = 71.3$ |
| $r_{15} = -35.8633$ | $d_{15} = 0.2$ | | |
| $r_{16} = 44.0038$ | $d_{16} = 1.5835$ | $n_{d16} = 1.834$ | $v_{d16} = 37.16$ |
| $r_{17} = 22.9718$ | $d_{17} = 3.4756$ | $n_{d17} = 1.497$ | $v_{d17} = 81.54$ |
| $r_{18} = -48.68$ | $d_{18} = D18$ | | |

-continued

Numerical data 2

| $r_{19} = -78.5752$ | $d_{19} = 1.6$ | $n_{d19} = 1.76182$ | $\nu_{d19} = 26.52$ |
| $r_{20} = -46.7222$ | $d_{20} = 1.6$ | $n_{d20} = 1.72916$ | $\nu_{d20} = 54.68$ |
| $r_{21} = 2058.414$ | | | |

Zoom data

| | Low-magnification | Middle | High-magnification |
|---|---|---|---|
| FL | 54 mm | 360 mm | 648 mm |
| NA | 0.032 | 0.025 | 0.01852 |
| Overall length | 85.5 mm | 85.5 mm | 85.5 mm |
| Exit end position | −231.4 | −223.0 | −216.9 |
| D5 | 0.400 | 26.062 | 29.523 |
| D10 | 36.291 | 4.634 | 0.999 |
| D13 | 17.386 | 11.982 | 3.570 |
| D18 | 0.282 | 11.380 | 20.267 |

Variable magnification ratio: 12

Focal lengths

| F1 = | 54.48 |
| F2 = | −17.72 |
| F3 = | −30.07 |
| F4 = | 30.92 |
| F5 = | −106.95 |
| F1/F3 = | −1.81 |
| F2/F3 = | 0.59 |
| F4/F3 = | −1.03 |
| F5/F3 = | 3.56 |
| F23L = | −6.30 |
| F23H = | −10.82 |
| F23L/F23H = | 1.72 |
| |F1/F23L| = | 8.64 |
| D3L/D0 = | 0.62 |
| (RG3/F3) · Z = | 9.37 |
| ng3 = | 1.7725 |

Third Embodiment

Figure 5A:
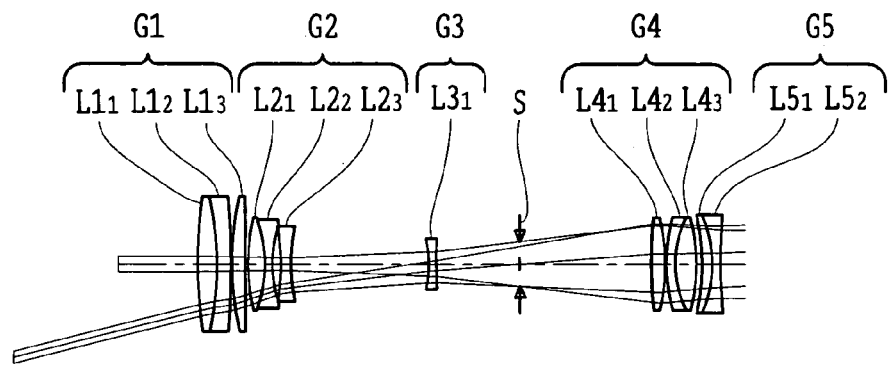
FIGS. 5A, 5B, and 5C are sectional views showing optical arrangements, developed along the optical axis, at low-magnification, middle, and high-magnification positions, respectively, of a third embodiment of the afocal zoom lens according to the present invention.
Figure 5B:
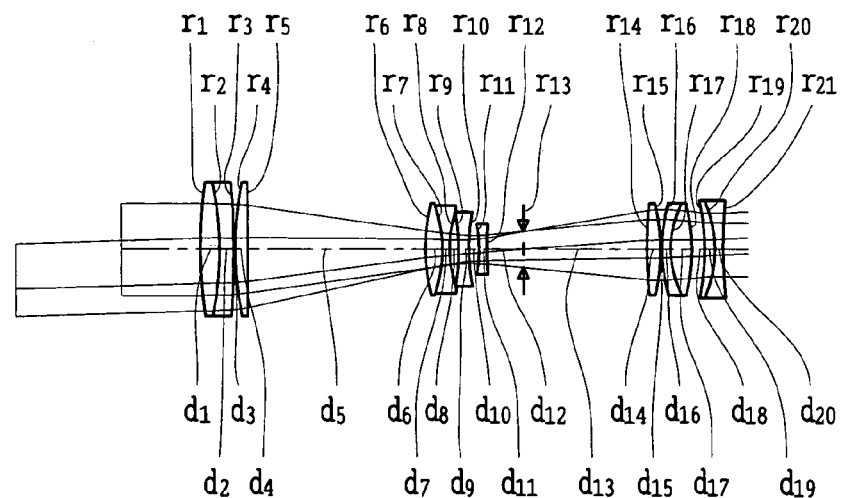
Figure 5C:
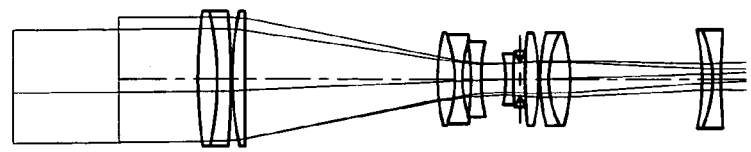
Figure 6A:
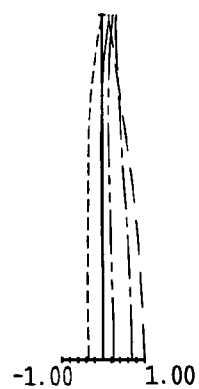
FIGS. 6A, 6B, and 6C are diagrams showing aberration characteristics at the low-magnification position of the afocal zoom lens in the third embodiment.
Figure 6B:
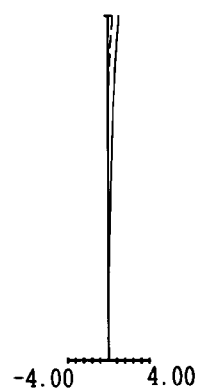
Figure 6C:
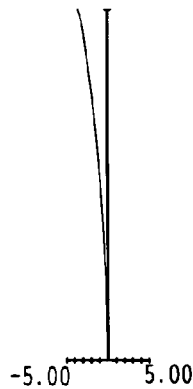
Figure 6D:
FIGS. 6D, 6E, and 6F are diagrams showing aberration characteristics at the middle position of the afocal zoom lens in the third embodiment.
Figure 6E:
Figure 6F:
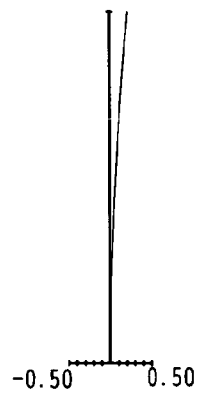
Figure 6G:
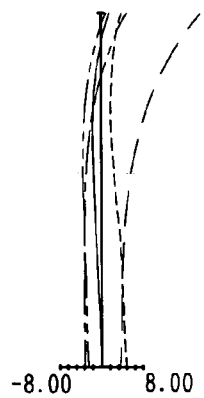
FIGS. 6G, 6H, and 6I are diagrams showing aberration characteristics at the high-magnification position of the afocal zoom lens in the third embodiment.
Figure 6H:
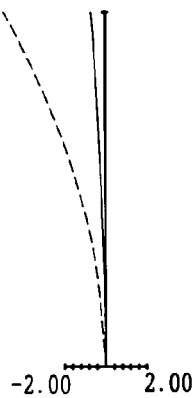
Figure 6I:
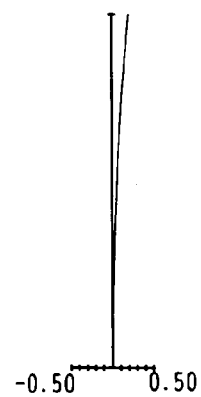

FIGS. 5A, 5B, and 5C show optical arrangements, developed along the optical axis, at low-magnification, middle, and high-magnification positions, respectively, of the third embodiment of the afocal zoom lens according to the present invention. FIGS. 6A–6C, 6D–6F, and 6G–6I show aberration characteristics at the low-magnification, middle, and high-magnification positions, respectively, of the afocal zoom lens in the third embodiment.

The afocal zoom lens of the third embodiment comprises, in order from the object side, the first lens unit G1 with positive refracting power, the second lens unit G2 with negative refracting power, the third lens unit G3 with negative refracting power, the aperture stop S, the fourth lens unit G4 with positive refracting power, and the fifth lens unit G5 with negative refracting power.

The first lens unit G1 includes, in order from the object side, the cemented lens component of the biconvex lens L1$_1$ and the negative meniscus lens L1$_2$ with the concave surface facing the object side, and the plano-convex lens L1$_3$ whose object-side surface is convex and whose image-side surface is flat.

The second lens unit G2 includes, in order from the object side, the cemented lens component of the biconvex lens L2$_1$ and the biconcave lens L2$_2$, and the biconcave lens L2$_3$.

The third lens unit G3 is constructed with the biconcave lens L3$_1$.

The fourth lens unit G4 includes the biconvex lens L4$_1$ and the cemented lens component of the negative meniscus lens L4$_2$ with the convex surface facing the object side and the biconvex lens L4$_3$.

The fifth lens unit G5 is constructed with the cemented lens component of the positive meniscus lens L5$_1$ with the concave surface facing the object side and the biconcave lens L5$_2$.

When the magnification is changed in the range from the low-magnification position to the high-magnification position, the first lens unit G1, the aperture stop S, and the fifth lens unit G5 remain fixed, the second lens unit G2 is moved from the object side toward the image side, the third lens unit G3 is moved from the object side toward the image side so that spacing between the second lens unit G2 and the third lens unit G3 is once narrowed and then somewhat widened, and the fourth lens unit G4 is moved from the image side toward the object side. The third lens unit G3 is moved when the magnification is changed, and thereby the optical system suppressing the shift of the position of the exit pupil is realized.

Subsequently, numerical data of optical members constituting the afocal zoom lens of the third embodiment are shown below.

Numerical data 3

| $r_1 = 80.2951$ | $d_1 = 3.7959$ | $n_{d1} = 1.497$ | $\nu_{d1} = 81.54$ |
| $r_2 = -55.7625$ | $d_2 = 2.6$ | $n_{d2} = 1.72825$ | $\nu_{d2} = 28.46$ |
| $r_3 = -185.593$ | $d_3 = 0.25$ | | |
| $r_4 = 55.2449$ | $d_4 = 2.5513$ | $n_{d4} = 1.56907$ | $\nu_{d4} = 71.3$ |
| $r_5 = \infty$ | $d_5 = D5$ | | |
| $r_6 = 34.9024$ | $d_6 = 3.2865$ | $n_{d6} = 1.7847$ | $\nu_{d6} = 26.29$ |
| $r_7 = -26.0188$ | $d_7 = 1.4898$ | $n_{d7} = 1.741$ | $\nu_{d7} = 52.64$ |
| $r_8 = 21.4048$ | $d_8 = 1.7059$ | | |
| $r_9 = -37.9087$ | $d_9 = 1.7856$ | $n_{d9} = 1.741$ | $\nu_{d9} = 52.64$ |
| $r_{10} = 24.7416$ | $d_{10} = D10$ | | |
| $r_{11} = -24.9718$ | $d_{11} = 1.8$ | $n_{d11} = 1.741$ | $\nu_{d11} = 52.64$ |
| $r_{12} = 631.4463$ | $d_{12} = D12$ | | |
| $r_{13} = \infty$ (Aperture stop) | $d_{13} = D13$ | | |
| $r_{14} = 78.5147$ | $d_{14} = 2.6378$ | $n_{d14} = 1.56907$ | $\nu_{d14} = 71.3$ |
| $r_{15} = -44.4687$ | $d_{15} = 0.2$ | | |
| $r_{16} = 32.7895$ | $d_{16} = 1.65$ | $n_{d16} = 1.834$ | $\nu_{d16} = 37.16$ |
| $r_{17} = 18.486$ | $d_{17} = 4.0922$ | $n_{d17} = 1.497$ | $\nu_{d17} = 81.54$ |
| $r_{18} = -42.954$ | $d_{18} = D18$ | | |
| $r_{19} = -44.0524$ | $d_{19} = 1.8628$ | $n_{d19} = 1.7552$ | $\nu_{d19} = 27.51$ |
| $r_{20} = -24.3713$ | $d_{20} = 1.6$ | $n_{d20} = 1.741$ | $\nu_{d20} = 52.64$ |
| $r_{21} = 89.3433$ | | | |

Zoom data

| | Low-magnification | Middle | High-magnification |
|---|---|---|---|
| FL | 45 mm | 360 mm | 1250 mm |
| NA | 0.032 | 0.025 | 0.00096 |
| Overall length | 100 mm | 100 mm | 100 mm |
| Exit end position | −237.1 | −233.5 | −211.0 |
| D5 | 0.392 | 33.819 | 36.692 |
| D10 | 26.206 | 2.041 | 4.789 |
| D12 | 15.901 | 6.638 | 1.018 |
| D13 | 25.007 | 23.710 | 0.925 |
| D18 | 1.187 | 2.484 | 25.269 |

Variable magnification ratio: 27.8

Focal lengths

| F1 = | 62.31 |
| F2 = | −17.75 |
| F3 = | −32.38 |
| F4 = | 26.49 |
| F5 = | −39.8076 |
| F1/F3 = | −1.92 |
| F2/F3 = | 0.55 |
| F4/F3 = | −0.82 |

-continued

Numerical data 3

| | |
|---|---|
| F5/F3 = | 1.23 |
| F23L = | −7.56 |
| F23H = | −10.53 |
| F23L/F23H = | 1.39 |
| |F1/F23L| = | 8.24 |
| D3L/D0 = | 0.44 |
| (RG3/F3) · Z = | 21.44 |
| ng3 = | 1.741 |

Fourth Embodiment

Figure 7A:
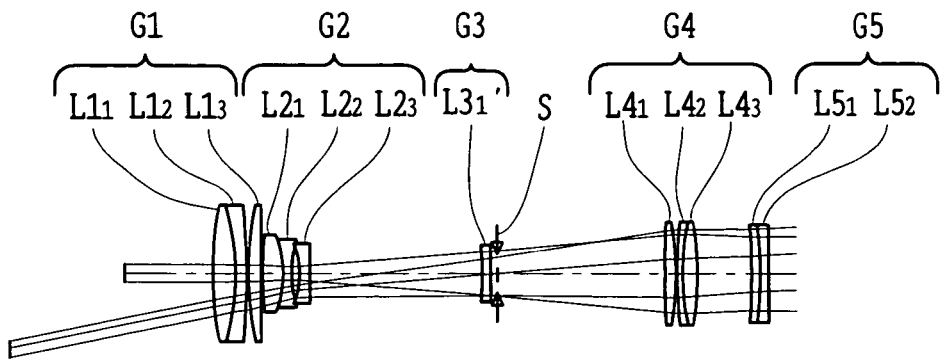
FIGS. 7A, 7B, and 7C are sectional views showing optical arrangements, developed along the optical axis, at low-magnification, middle, and high-magnification positions, respectively, of a fourth embodiment of the afocal zoom lens according to the present invention.
Figure 7B:
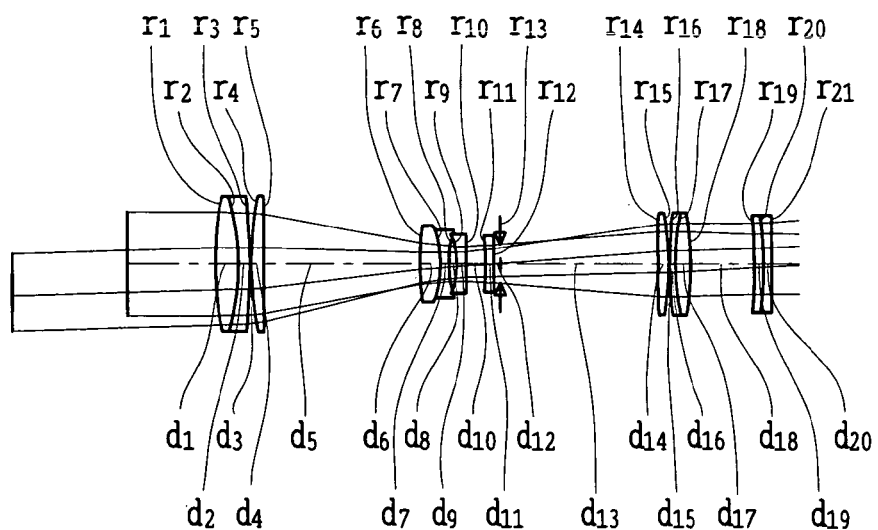
Figure 7C:
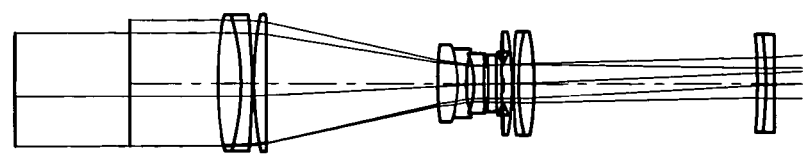

FIGS. 7A, 7B, and 7C show optical arrangements, developed along the optical axis, at low-magnification, middle, and high-magnification positions, respectively, of the fourth embodiment of the afocal zoom lens according to the present invention. FIGS. 8A–8C, 8D–8F, and 8G–8I show aberration characteristics at the low-magnification, middle, and high-magnification positions, respectively, of the afocal zoom lens in the fourth embodiment.

The afocal zoom lens of the fourth embodiment comprises, in order from the object side, the first lens unit G1 with positive refracting power, the second lens unit G2 with negative refracting power, the third lens unit G3 with negative refracting power, the aperture stop S, the fourth lens unit G4 with positive refracting power, and the fifth lens unit G5 with negative refracting power.

The first lens unit G1 includes, in order from the object side, the cemented lens component of the biconvex lens $L1_1$ and the negative meniscus lens $L1_2$ with the concave surface facing the object side, and the plano-convex lens $L1_3$ whose object-side surface is convex and whose image-side surface is flat.

The second lens unit G2 includes, in order from the object side, the cemented lens component of the biconvex lens $L2_1$ and the biconcave lens $L2_2$, and the biconcave lens $L2_3$.

The third lens unit G3 is constructed with a plano-concave lens $L3_1'$ whose object-side surface is concave and whose image-side surface is flat.

The fourth lens unit G4 includes the biconvex lens $L4_1$ and the cemented lens component of the negative meniscus lens $L4_2$ with the convex surface facing the object side and the biconvex lens $L4_3$.

The fifth lens unit G5 is constructed with the cemented lens component of the positive meniscus lens $L5_1$ with the concave surface facing the object side and the biconcave lens $L5_2$.

When the magnification is changed in the range from the low-magnification position to the high-magnification position, the first lens unit G1, the third lens unit G3, the aperture stop S, and the fifth lens unit G5 remain fixed, the second lens unit G2 is moved from the object side toward the image side, and the fourth lens unit G4 is moved from the image side toward the object side.

Subsequently, numerical data of optical members constituting the afocal zoom lens of the fourth embodiment are shown below.

Numerical data 4

| | | | |
|---|---|---|---|
| $r_1$ = 51.4154 | $d_1$ = 4.0083 | $n_{d1}$ = 1.43875 | $v_{d1}$ = 94.93 |
| $r_2$ = −46.1254 | $d_2$ = 2 | $n_{d2}$ = 1.68893 | $v_{d2}$ = 31.07 |
| $r_3$ = −139.727 | $d_3$ = 0.25 | | |
| $r_4$ = 52.2809 | $d_4$ = 2.1703 | $n_{d4}$ = 1.603 | $v_{d4}$ = 65.44 |
| $r_5$ = ∞ | $d_5$ = D5 | | |
| $r_6$ = 63.3929 | $d_6$ = 3.5049 | $n_{d6}$ = 1.7847 | $v_{d6}$ = 26.29 |
| $r_7$ = −19.3362 | $d_7$ = 1.5103 | $n_{d7}$ = 1.741 | $v_{d7}$ = 52.64 |
| $r_8$ = 16.1879 | $d_8$ = 1.3419 | | |
| $r_9$ = −18.7999 | $d_9$ = 1.8 | $n_{d9}$ = 1.755 | $v_{d9}$ = 52.32 |
| $r_{10}$ = 95.7422 | $d_{10}$ = D10 | | |
| $r_{11}$ = −213.202 | $d_{11}$ = 1.8 | $n_{d11}$ = 1.834 | $v_{d11}$ = 37.16 |
| $r_{12}$ = ∞ | $d_{12}$ = 1 | | |
| $r_{13}$ = ∞ (Aperture stop) | $d_{13}$ = D13 | | |
| $r_{14}$ = 277.7207 | $d_{14}$ = 1.8148 | $n_{d14}$ = 1.56907 | $v_{d14}$ = 71.3 |
| $r_{15}$ = −60.8805 | $d_{15}$ = 0.2 | | |
| $r_{16}$ = 71.4519 | $d_{16}$ = 0.968 | $n_{d16}$ = 1.834 | $v_{d16}$ = 37.16 |
| $r_{17}$ = 38.4312 | $d_{17}$ = 2.686 | $n_{d17}$ = 1.43875 | $v_{d17}$ = 94.93 |
| $r_{18}$ = −65.9166 | $d_{18}$ = D18 | | |
| $r_{19}$ = −123.656 | $d_{19}$ = 1.5 | $n_{d19}$ = 1.76182 | $v_{d19}$ = 26.52 |
| $r_{20}$ = −73.6322 | $d_{20}$ = 1.4 | $n_{d20}$ = 1.741 | $v_{d20}$ = 52.64 |
| $r_{21}$ = 2395.896 | | | |

Zoom data

| | Low-magnification | Middle | High-magnification |
|---|---|---|---|
| FL | 54 mm | 360 mm | 864 mm |
| NA | 0.03 | 0.025 | 0.01273 |
| Overall length | 97 mm | 97 mm | 97 mm |
| Exit end position | −259.6 | −253.9 | −228.1 |
| D5 | 0.368 | 27.168 | 29.776 |
| D10 | 29.982 | 3.182 | 0.574 |
| D13 | 29.478 | 27.569 | −0.255 |
| D18 | 9.218 | 11.126 | 38.951 |

Variable magnification ratio: 16.0

Focal lengths

| | |
|---|---|
| F1 = | 52.02 |
| F2 = | −12.78 |
| F3 = | −255.64 |
| F4 = | 51.91 |
| F5 = | −161.579 |
| F1/F3 = | −0.20 |
| F2/F3 = | 0.05 |
| F4/F3 = | −0.20 |
| F5/F3 = | 0.63 |
| F23L = | −10.92 |
| F23H = | −12.10 |
| F23L/F23H = | 1.11 |
| |F1/F23L| = | 4.77 |
| D3L/D0 = | 0.48 |
| (RG3/F3) · Z = | 13.34 |
| ng3 = | 1.834 |

Fifth Embodiment

Figure 9A:
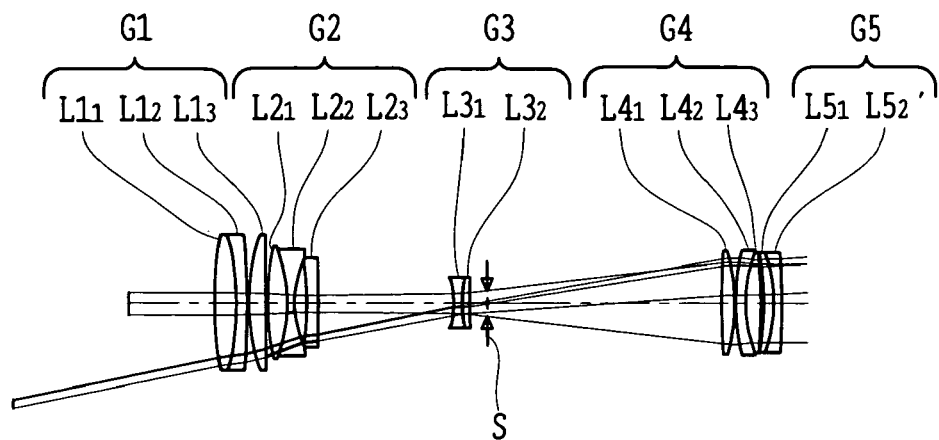
FIGS. 9A, 9B, and 9C are sectional views showing optical arrangements, developed along the optical axis, at low-magnification, middle, and high-magnification positions, respectively, of a fifth embodiment of the afocal zoom lens according to the present invention.
Figure 9B:
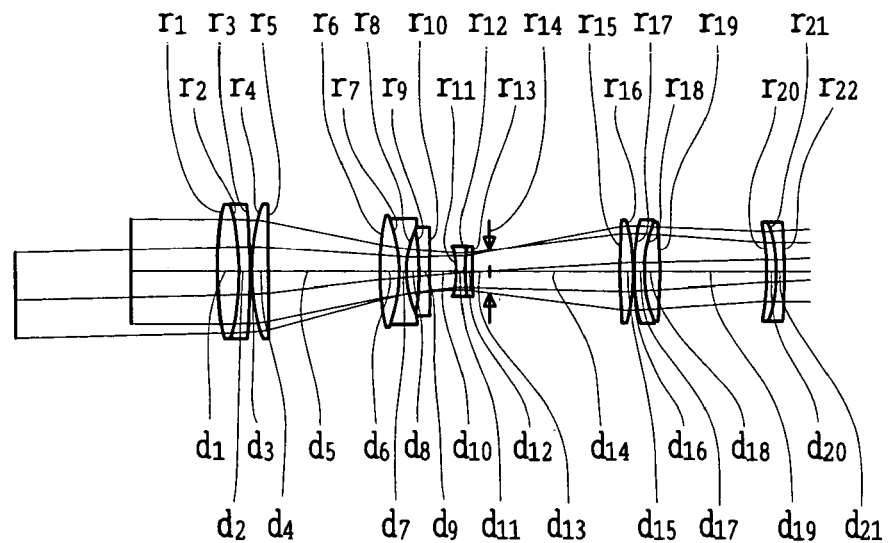
Figure 9C:
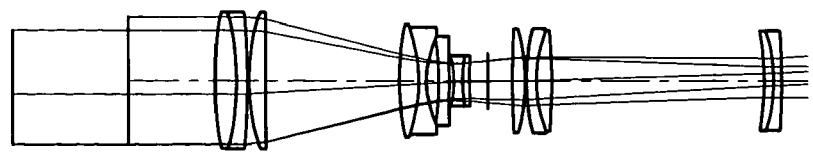
Figure 10A:
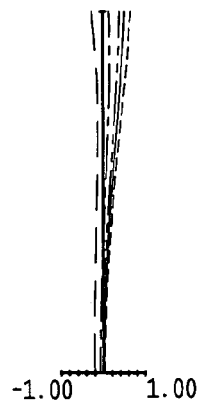
FIGS. 10A, 10B, and 10C are diagrams showing aberration characteristics at the low-magnification position of the afocal zoom lens in the fifth embodiment.
Figure 10B:
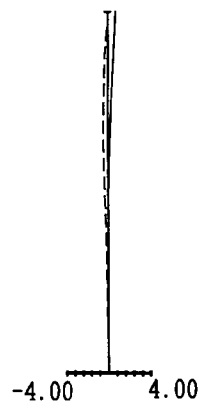
Figure 10C:
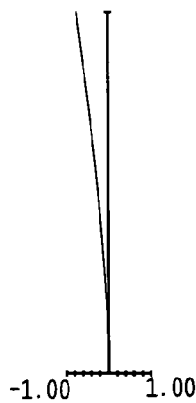
Figure 10D:
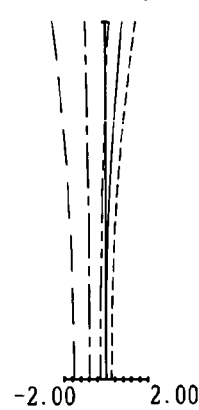
FIGS. 10D, 10E, and 10F are diagrams showing aberration characteristics at the middle position of the afocal zoom lens in the fifth embodiment.
Figure 10E:
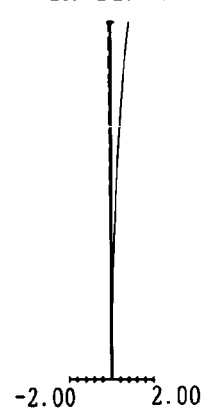
Figure 10F:
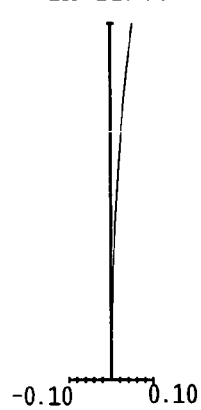
Figure 10G:
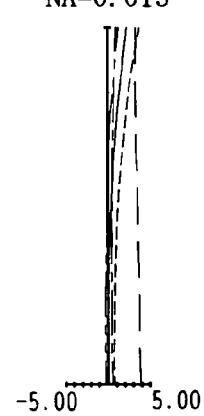
FIGS. 10G, 10H, and 10I are diagrams showing aberration characteristics at the high-magnification position of the afocal zoom lens in the fifth embodiment.
Figure 10H:
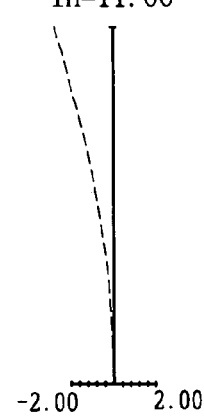
Figure 10I:
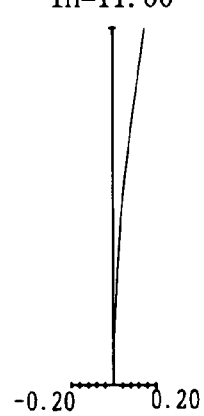

FIGS. 9A, 9B, and 9C show optical arrangements, developed along the optical axis, at low-magnification, middle, and high-magnification positions, respectively, of the fifth embodiment of the afocal zoom lens according to the present invention. FIGS. 10A–10C, 10D–10F, and 10G–10I show aberration characteristics at the low-magnification, middle, and high-magnification positions, respectively, of the afocal zoom lens in the fifth embodiment.

The afocal zoom lens of the fifth embodiment comprises, in order from the object side, the first lens unit G1 with positive refracting power, the second lens unit G2 with negative refracting power, the third lens unit G3 with negative refracting power, the aperture stop S, the fourth lens unit G4 with positive refracting power, and the fifth lens unit G5 with negative refracting power.

The first lens unit G1 includes, in order from the object side, the cemented lens component of the biconvex lens $L1_1$ and the negative meniscus lens $L1_2$ with the concave surface facing the object side, and the plano-convex lens $L1_3$ whose object-side surface is convex and whose image-side surface is flat.

The second lens unit G2 includes, in order from the object side, the cemented lens component of the biconvex lens $L2_1$ and the biconcave lens $L2_2$, and the biconcave lens $L2_3$.

The third lens unit G3 includes the biconcave lens $L3_1$ and a positive meniscus lens $L3_2$ with a convex surface facing the object side.

The fourth lens unit G4 includes the biconvex lens $L4_1$ and the cemented lens component of the negative meniscus lens $L4_2$ with the convex surface facing the object side and the biconvex lens $L4_3$.

The fifth lens unit G5 is constructed with a cemented lens component of the positive meniscus lens $L5_1$ with the concave surface facing the object side and a negative meniscus lens $L5_2'$ with a concave surface facing the object side.

When the magnification is changed in the range from the low-magnification position to the high-magnification position, the first lens unit G1, the third lens unit G3, the aperture stop S, and the fifth lens unit G5 remain fixed, the second lens unit G2 is moved from the object side toward the image side, and the fourth lens unit G4 is moved from the image side toward the object side.

Subsequently, numerical data of optical members constituting the afocal zoom lens of the fifth embodiment are shown below.

Numerical data 5

| | | | |
|---|---|---|---|
| $r_1 = 62.9444$ | $d_1 = 3.7346$ | $n_{d1} = 1.43875$ | $v_{d1} = 94.93$ |
| $r_2 = -46.3547$ | $d_2 = 1.8217$ | $n_{d2} = 1.68893$ | $v_{d2} = 31.07$ |
| $r_3 = -180.974$ | $d_3 = 0.25$ | | |
| $r_4 = 33.7155$ | $d_4 = 2.8449$ | $n_{d4} = 1.56907$ | $v_{d4} = 71.3$ |
| $r_5 = \infty$ | $d_5 = D5$ | | |
| $r_6 = 52.1293$ | $d_6 = 3.2408$ | $n_{d6} = 1.7847$ | $v_{d6} = 26.29$ |
| $r_7 = -29.0932$ | $d_7 = 1.3025$ | $n_{d7} = 1.741$ | $v_{d7} = 52.64$ |
| $r_8 = 19.2144$ | $d_8 = 2.1443$ | | |
| $r_9 = -60.3387$ | $d_9 = 1.8$ | $n_{d9} = 1.755$ | $v_{d9} = 52.32$ |
| $r_{10} = 556.9835$ | $d_{10} = D10$ | | |
| $r_{11} = -15.2124$ | $d_{11} = 1.4$ | $n_{d11} = 1.788$ | $v_{d11} = 47.37$ |

-continued

Numerical data 5

| | | | |
|---|---|---|---|
| $r_{12} = 22.7388$ | $d_{12} = 1.4606$ | $n_{d12} = 1.68893$ | $v_{d12} = 31.07$ |
| $r_{13} = 130.3733$ | $d_{13} = 3$ | | |
| $r_{14} = \infty$ (Aperture stop) | $d_{14} = D14$ | | |
| $r_{15} = 107.7266$ | $d_{15} = 2.2666$ | $n_{d15} = 1.56907$ | $v_{d15} = 71.3$ |
| $r_{16} = -36.2893$ | $d_{16} = 0.2$ | | |
| $r_{17} = 40.7491$ | $d_{17} = 1.6709$ | $n_{d17} = 1.834$ | $v_{d17} = 37.16$ |
| $r_{18} = 23.1439$ | $d_{18} = 2.7546$ | $n_{d18} = 1.43875$ | $v_{d18} = 94.93$ |
| $r_{19} = -97.7421$ | $d_{19} = D19$ | | |
| $r_{20} = -55.2552$ | $d_{20} = 1.6731$ | $n_{d20} = 1.68893$ | $v_{d20} = 31.07$ |
| $r_{21} = -28.8866$ | $d_{21} = 1.3157$ | $n_{d21} = 1.741$ | $v_{d21} = 52.64$ |
| $r_{22} = -579.261$ | | | |

Zoom data

| | Low-magnification | Middle | High-magnification |
|---|---|---|---|
| FL | 54 mm | 360 mm | 864 mm |
| NA | 0.032 | 0.025 | 0.01273 |
| Overall length | 98 mm | 98 mm | 98 mm |
| Exit end position | −422.8 | −239.5 | −222.9 |
| D5 | 0.404 | 19.610 | 23.433 |
| D10 | 23.819 | 4.614 | 0.791 |
| D14 | 40.413 | 22.512 | 4.303 |
| D19 | 0.483 | 18.385 | 36.593 |

Variable magnification ratio: 16.0

Focal lengths

| | |
|---|---|
| F1 = | 45.62 |
| F2 = | −28.99 |
| F3 = | −16.11 |
| F4 = | 34.62 |
| F5 = | −77.0173 |
| F1/F3 = | −2.83 |
| F2/F3 = | 1.80 |
| F4/F3 = | −2.15 |
| F5/F3 = | 10.03 |
| F23L = | −6.65 |
| F23H = | −9.89 |
| F23L/F23H = | 1.49 |
| |F1/F23L| = | 6.86 |
| D3L/D0 = | 0.42 |
| (RG3/F3) · Z = | 15.11 |
| ng3 = | 1.788 |

Subsequently, a list of preset data in the embodiments is shown in Table 1.

TABLE 1

| | 1st embodiment | 2nd embodiment | 3rd embodiment | 4th embodiment | 5th embodiment |
|---|---|---|---|---|---|
| Low-magnification position | 54 | 54 | 45 | 54 | 54 |
| Middle position | 360 | 360 | 360 | 360 | 360 |
| High-magnification position | 864 | 648 | 1250 | 864 | 864 |
| Variable magnification ratio | 16 | 12 | 27.8 | 16 | 16 |
| Overall length | 95 | 85.5 | 100 | 97 | 98 |
| 3rd lens unit | Fixed | Moved | Moved | Fixed | Fixed |
| Aperture stop | Fixed | Moved with the 3rd lens unit | Fixed | Fixed | Fixed |
| Exit pupil (low) | −539 | −231.4 | −237.1 | −259.6 | −422.8 |
| Exit pupil (middle) | −238.7 | −223 | −233.5 | −253.9 | −239.5 |
| Exit pupil (high) | −220.6 | −216.9 | −211 | −228.1 | −222.9 |
| F1/F3 | −2.07 | −1.81 | −1.92 | −0.20 | −2.83 |
| F2/F3 | 0.80 | 0.59 | 0.55 | 0.05 | 1.80 |
| F4/F3 | −1.33 | −1.03 | −0.82 | −0.20 | −2.15 |
| F5/F3 | 2.90 | 3.56 | 1.23 | 0.63 | 10.03 |
| F1 | 50.55 | 54.48 | 62.31 | 52.02 | 45.62 |
| F2 | −19.57 | −17.72 | −17.75 | −12.78 | −28.99 |
| F3 | −24.47 | −30.07 | −32.38 | −255.64 | −16.11 |

TABLE 1-continued

|  | 1st embodiment | 2nd embodiment | 3rd embodiment | 4th embodiment | 5th embodiment |
|---|---|---|---|---|---|
| F4 | 32.47 | 30.92 | 26.49 | 51.91 | 34.62 |
| F5 | −71.00 | −106.95 | −39.8076 | −161.5789 | −77.0173 |
| F23L | −6.91 | −6.30 | −7.56 | −10.92 | −6.65 |
| F23H | −10.49 | −10.82 | −10.53 | −12.10 | −9.89 |
| F23L/F23H | 1.52 | 1.72 | 1.39 | 1.11 | 1.49 |
| |F1/F23L| | 7.32 | 8.64 | 8.24 | 4.77 | 6.86 |
| D3L/D0 | 0.47 | 0.62 | 0.44 | 0.48 | 0.42 |
| RG3/F3 · Z | 15.53 | 9.37 | 21.44 | 13.34 | 15.11 |
| ng3 | 1.7847 | 1.7725 | 1.741 | 1.834 | 1.788 |

Figure 11:
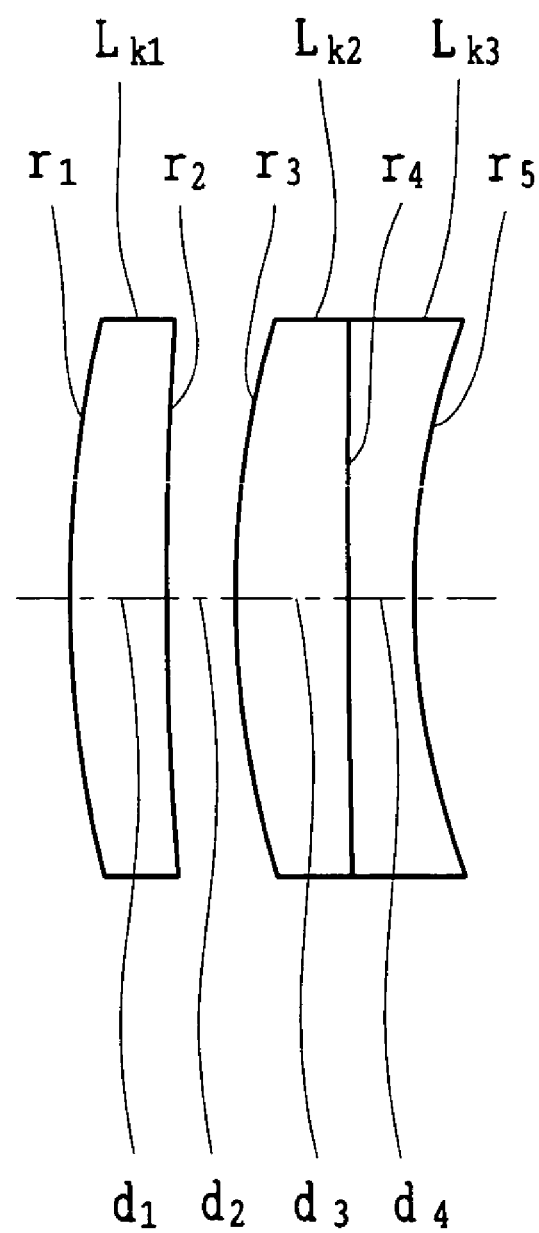
FIG. 11 is a sectional view showing an example of an arrangement, developed along the optical axis, of an imaging lens combined with the afocal zoom lens of each of the above embodiments.

FIG. 11 show an example of an arrangement, developed along the optical axis, of an imaging lens combined with the afocal zoom lens of each of the above embodiments.

The imaging lens of this example includes, in order from the object side, a positive meniscus lens $L_{k1}$ with a convex surface facing the object side and a cemented lens component of a positive meniscus lens $L_{k2}$ and a negative meniscus lens $L_{k3}$ with a convex surface facing the object side.

The afocal zoom lens of each embodiment is combined with the imaging lens as an imaging lens optical system by placing a prism optical system (not shown) on the image side of the imaging lens.

Next, numerical data of optical members constituting the imaging lens optical system of FIG. 11 are shown below. Also, the numerical data contain the data of the prism optical system placed on the image side of the imaging lens.

Numerical data 6
FL 211.675 mm

| | | | |
|---|---|---|---|
| $r_1 = 37.966$ | $d_1 = 3$ | $n_{d1} = 1.51742$ | $v_{d1} = 52.43$ |
| $r_2 = 134.562$ | $d_2 = 2.08$ | | |
| $r_3 = 31.192$ | $d_3 = 3.5$ | $n_{d3} = 1.48749$ | $v_{d3} = 70.23$ |
| $r_4 = 340.249$ | $d_4 = 2$ | $n_{d4} = 1.58267$ | $v_{d4} = 46.42$ |
| $r_5 = 24.76$ | $d_5 = 22$ | | |
| $r_6 = \infty$ | $d_6 = 100$ | $n_{d6} = 1.51633$ | $v_{d6} = 64.14$ |
| $r_7 = \infty$ | $d_7 = 0$ | | |
| $r_8 = \infty$ | $d_8 = 65$ | $n_{d8} = 1.56883$ | $v_{d8} = 56.36$ |
| $r_9 = \infty$ | $d_9 = 53.2061$ | | |
| $r_{10} = \infty$ (Image plane) | $d_{10} = 0$ | | |

What is claimed is:

1. An afocal zoom lens for microscopes, comprising five lens units having, in order from an object side, positive, negative, negative, positive, and negative refracting powers, wherein when a magnification of the afocal zoom lens is changed in a range from a low-magnification position to a high-magnification position, a first lens unit and a fifth lens unit are fixed, a second lens unit is moved toward the image side, and a fourth lens unit is moved toward the object side.

2. An afocal zoom lens for microscopes according to claim 1, satisfying the following condition:

$$0 \leq F2/F3 \leq 2.5$$

where F2 is a focal length of the second lens unit and F3 is a focal length of a third lens unit.

3. An afocal zoom lens for microscopes according to claim 1 or 2, wherein the third lens unit is constructed with at least one negative lens with a concave surface facing the object side.

4. An afocal zoom lens for microscopes according to claim 1, satisfying the following condition:

$$1 \leq F23L/F23H \leq 3$$

where F23L is a combined focal length of the second lens unit and the third lens unit at the low-magnification position and F23H is a combined focal length of the second lens unit and the third lens unit at the high-magnification position.

5. An afocal zoom lens for microscopes according to claim 1, satisfying the following condition:

$$3 \leq |F1/F23L| \leq 15$$

where F1 is a focal length of the first lens unit and F23L is a combined focal length of the second lens unit and the third lens unit at the low-magnification position.

6. An afocal zoom lens for microscopes according to claim 1, satisfying the following condition:

$$0.3 \leq D3L/D \leq 0.7$$

where D3L is a distance from an object-side surface of the first lens unit to an object-side surface of the third lens unit at the low-magnification position and DO is an overall length of the afocal zoom lens.

7. An afocal zoom lens for microscopes according to any one of claims 4–6, satisfying the following conditions:

$$7 \leq RG3/F3 \times Z \leq 30$$

$$1.65 \leq ng3$$

where F3 is a focal length of the third lens unit, RG3 is a radius of curvature of a concave surface facing the object side, of a negative lens, ng3 is a refractive index of the negative lens, and Z is a variable magnification ratio.

8. An afocal zoom lens for microscopes according to claim 1 or 2, wherein an aperture stop is interposed between the second lens unit and the fourth lens unit.

9. An afocal zoom lens for microscopes according to claim 3, satisfying the following conditions:

$$7 \leq RG3F3 \times Z \leq 30$$

$$1.65 \leq ng3$$

where F3 is a focal length of the third lens unit, RG3 is a radius of curvature of a concave surface facing the object side, of a negative lens, ng3 is a refractive index of the negative lens, and Z is a variable magnification ration.

* * * * *

UNITED STATES PATENT AND TRADEMARK OFFICE
CERTIFICATE OF CORRECTION

PATENT NO.       : 7,072,119 B2                                   Page 1 of 1
APPLICATION NO.  : 10/938884
DATED            : July 4, 2006
INVENTOR(S)      : Kenji Kawasaki It is certified that error appears in the above-identified patent and that said Letters Patent is hereby corrected as shown below:

Column 16, line 55, change "$7 \leqq RG3F3 \times Z \leqq 30$" to --$7 \leqq RG3/F3 \times Z \leqq 30$--.

Signed and Sealed this

First Day of May, 2007

JON W. DUDAS
*Director of the United States Patent and Trademark Office*